US009571659B2

(12) United States Patent
Barrett et al.

(10) Patent No.: US 9,571,659 B2
(45) Date of Patent: *Feb. 14, 2017

(54) TELECONFERENCE CALLS BASED ON CALENDAR EVENTS

(71) Applicant: CloudCar, Inc., Los Altos, CA (US)

(72) Inventors: Peter Barrett, Palo Alto, CA (US); Bruce Leak, Los Altos Hills, CA (US); Konstantin Othmer, Los Altos, CA (US); Zarko Draganic, Belvedere, CA (US)

(73) Assignee: CLOUDCAR, INC., East Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,069

(22) Filed: Jan. 4, 2016

(65) Prior Publication Data
US 2016/0119482 A1    Apr. 28, 2016

Related U.S. Application Data (63) Continuation of application No. 13/975,734, filed on Aug. 26, 2013, now Pat. No. 9,232,069.

(51) Int. Cl.
*H04M 3/42*   (2006.01)
*H04M 3/56*   (2006.01)
(Continued)

(52) U.S. Cl.
CPC ............ *H04M 3/56* (2013.01); *H04L 65/1069* (2013.01); *H04L 65/403* (2013.01);
(Continued)

(58) Field of Classification Search
CPC ...... H04M 3/56; H04M 3/565; H04M 1/6075; H04W 4/046; H04W 4/16; H04L 65/1069; H04L 65/403
See application file for complete search history.

(56) References Cited

U.S. PATENT DOCUMENTS

5,301,227 A    4/1994  Kamei et al.
6,449,541 B1   9/2002  Goldberg et al.
(Continued)

*Primary Examiner* — Ajit Patel
(74) *Attorney, Agent, or Firm* — Maschoff Brennan (57) ABSTRACT

An embodiment includes a non-transitory computer-readable medium with programming code executable by a processor to perform operations including accessing a scheduled time and teleconference contact information associated with a teleconference calendar event. The operations include determining whether an operator is operating a vehicle based on synchronization between a mobile device and an abstraction and communication device (device) interfaced with the vehicle. When an actual time is within a threshold of the scheduled time and the operator is operating the vehicle, the operations include determining whether the operator is a participant of a teleconference. If so, the operations include extracting the teleconference contact information from the teleconference calendar event. The operations include communicating a prompt to join the teleconference and receiving a confirmation to join the teleconference. The operations include communicating a signal indicating the confirmation via the device and placing a call to join the teleconference.

20 Claims, 4 Drawing Sheets

(51) Int. Cl.
*H04W 4/04* (2009.01)
*H04L 29/06* (2006.01)
*H04M 1/60* (2006.01)
*H04W 4/16* (2009.01)

(52) U.S. Cl.
CPC ......... *H04M 1/6075* (2013.01); *H04M 3/565* (2013.01); *H04W 4/046* (2013.01); *H04W 4/16* (2013.01)

(56) References Cited

U.S. PATENT DOCUMENTS

| | | | |
|---|---|---|---|
| 7,515,703 B1 * | 4/2009 | Grigsby | H04M 1/247 367/901 |
| 2005/0014490 A1 | 1/2005 | Desai et al. | |
| 2008/0171539 A1 | 7/2008 | Ahonen et al. | |
| 2008/0267379 A1 * | 10/2008 | Jagdale | H04M 3/56 379/202.01 |
| 2010/0246792 A1 * | 9/2010 | Acosta | H04M 3/56 379/202.01 |
| 2012/0079459 A1 | 3/2012 | Bates et al. | |
| 2012/0243673 A1 | 9/2012 | Carr et al. | |
| 2012/0254763 A1 | 10/2012 | Protopapas et al. | |
| 2012/0258627 A1 | 10/2012 | Huang | |
| 2013/0143539 A1 | 6/2013 | Baccay et al. | |
| 2013/0217372 A1 | 8/2013 | Poon | |
| 2013/0331075 A1 * | 12/2013 | Hole | H04W 4/02 455/416 |
| 2014/0035949 A1 | 2/2014 | Singh et al. | |
| 2014/0066036 A1 | 3/2014 | Haid et al. | |
| 2015/0019231 A1 | 1/2015 | Sadler et al. | |

* cited by examiner

TELECONFERENCE CALLS BASED ON CALENDAR EVENTS

RELATED APPLICATION

This application is a continuation of U.S. patent application Ser. No. 13/975,734, filed Aug. 26, 2013, which is incorporated herein by reference in its entirety.

FIELD

The embodiments discussed herein relate to teleconferencing. More particularly, some example embodiments relate to utilization of a calendar application in teleconferencing.

RELEVANT TECHNOLOGY

Commercial calendar applications are widely used to track, store, and schedule events. Some examples of calendar applications include Apple Calendar (formerly iCal), Microsoft Outlook, Yahoo Calendar, and Google Calendar. In these and other calendar applications, events are input as calendar events. The calendar events tie events to scheduled times.

A common event scheduled in calendar applications is a teleconference. As used herein, a teleconference calendar event ties a scheduled teleconference to a scheduled time. Teleconference calendar events typically include relevant information pertaining to the teleconference. For example, the scheduled time of the teleconference, teleconference contact information such as the call-in telephone number and a pin, other attendees of the teleconference, their contact information, etc. may be included in the teleconference calendar event. The user of the calendar application, or another authorized user such as an assistant, usually inputs each of these pieces of information or this information is included in an invitation communicated to the user and input into a teleconference calendar event.

Some commercial calendar applications interface with a user's email account. For instance, Outlook incorporates email software with calendar functionality. For example, as a teleconference nears, Outlook includes the capability to send a reminder to the user or otherwise generate a reminder to remind the user of the teleconference. Outlook also includes the ability to email meeting invitations generated in the calendar application to other users and to receive such invitations; if a meeting invitation is accepted, it is added to the calendar application as a calendar event. Aside from email, however, calendar applications have limited interaction with other systems or applications.

Teleconferencing generally allows multiple individuals to call a single number and participate in a meeting over the phone and/or internet. Most teleconferencing services are provided by a third party that provides one reliable connection that each participant of a teleconference uses to connect to the teleconference.

However, the participants of a teleconference have to input teleconference contact information manually. This can be a cumbersome process, often including multiple numbers and interaction with an automated system. Additionally, in the event a participant loses her connection to the teleconference, these manual steps must be repeated to re-join the teleconference. This process is particularly cumbersome when a participant is operating a vehicle. In some circumstances, the participant may be forced to pull over to input teleconference contact information to avoid causing an unsafe condition and/or to comply with local or state laws.

The subject matter claimed herein is not limited to embodiments that solve any disadvantages or that operate only in environments such as those described above. Rather, this background is only provided to illustrate one example technology area where some embodiments described herein may be practiced.

SUMMARY

This Summary introduces a selection of concepts in a simplified form that are further described below. This Summary is not intended to identify key features or essential characteristics of the claimed subject matter, nor is it intended to be used as an aid in determining the scope of the claimed subject matter.

An example embodiment disclosed herein includes a vehicle teleconference system. In general, the vehicle teleconference system uses vehicle data and information accessed from a calendar application of an operator to determine that the operator is a participant of a teleconference that will occur or is occurring while the operator is operating a vehicle. When this determination is made, the vehicle teleconferencing system prompts the operator to join the teleconference. Upon confirmation by the operator, the vehicle teleconference system automatically connects the operator to the teleconference.

In some embodiments, the vehicle teleconferencing system includes an abstraction and communication device (hereinafter "device") and a mobile device such as a smartphone. The device abstracts relevant vehicle data from the vehicle used to determine whether the operator is operating the vehicle. The device includes an adaptor, which is configured to interface with a Controller Area Network (hereinafter "CAN") bus of the vehicle. Through interfacing with the CAN bus, the device can abstract the vehicle data pertaining to operational states of vehicle components and process these data. The device communicates the vehicle data to the mobile device.

The mobile device includes an operation determination module, a clock, and a teleconferencing module. The operation determination module receives the vehicle data from the device and determines whether the operator is operating the vehicle. The determination is communicated to a navigation module. The clock tracks actual time (date and time of day), which is communicated to the navigation module.

The teleconferencing module receives the actual time and the determination that the operator is operating the vehicle. Additionally, the teleconferencing module accesses teleconference information from the calendar application. For example, the teleconferencing module can access teleconference information from a local calendar application loaded on the mobile device or access teleconference information located on a remote calendar application via a communication network. An example of the remote calendar application is Google Calendar or similar calendar applications, which store calendar event data on a cloud network that is accessible via a wireless communication network. Based on the actual time and the determination that the operator is operating the vehicle, the teleconference module determines that the operator is a participant in a teleconference, which will occur or is occurring while the operator is operating the vehicle.

The teleconference module extracts the teleconference contact information from the calendar application and communicates the teleconference contact information to the mobile device that connects to the teleconference. For example, the teleconference contact information can include a teleconference telephone number and a teleconference pin number. The teleconference module interfaces with the mobile device such that the mobile device dials the teleconference telephone number and when prompted, enters the teleconference pin number.

In some embodiments, the teleconference module is also configured to monitor the connection between the mobile device and the teleconference. When an interruption in the connection is detected, the teleconference module re-prompts the operator to re-join the teleconference. If a confirmation to re-join is received from the operator, then the mobile device re-connects the mobile device to the teleconference using the teleconference contact information.

Another embodiment includes a method of automated teleconferencing while operating a vehicle. The method includes obtaining permission from an operator to access a calendar application including a teleconference calendar event of the operator. The method also includes accessing teleconference contact information and a scheduled time associated with the teleconference calendar event. Based on the scheduled time and a determination that the operator is operating a vehicle, the method includes determining that the operator is a participant in a teleconference represented by the teleconference calendar event.

Another embodiment includes a method of teleconferencing during operation of a vehicle. The method includes accessing a scheduled time and teleconference contact information associated with a teleconference calendar event. When an actual time is within a predetermined threshold of the scheduled time and an operator of a vehicle is operating the vehicle, the method also includes determining that the operator is a participant in a teleconference represented by the teleconference calendar event. The teleconference contact information is extracted from the teleconference calendar event. The operator is prompted to join the teleconference.

Additional features and advantages will be set forth in the description which follows, and in part will be obvious from the description, or may be learned by the practice of the embodiments. The features and advantages of the embodiments will be realized and obtained by means of the instruments and combinations particularly pointed out in the claims. These and other features will become more fully apparent from the following description and claims, or may be learned by the practice of the embodiments as set forth hereinafter.

BRIEF DESCRIPTION OF THE DRAWINGS

Embodiments will be described and explained with additional specificity and detail through the use of the accompanying drawings in which.

DESCRIPTION OF SOME EXAMPLE EMBODIMENTS

Some example embodiments discussed herein relate to utilization of a calendar application to join a teleconference while driving. Particularly, some embodiments reduce or eliminate altogether the necessity of manually inputting teleconference telephone numbers and teleconference pin numbers, which may distract an operator of a vehicle and cause an unsafe condition. To schedule a teleconference in a calendar application, a teleconference calendar event is created by an operator, an assistant, or the like, often on a desktop or laptop computer, tablet, or smartphone outside of the user's vehicle. The teleconference calendar event usually includes a scheduled time of the teleconference and teleconference contact information. The teleconference calendar event and vehicle data are accessed to determine whether the operator is operating a vehicle during a scheduled teleconference. For instance, criteria such as whether the vehicle is operating, the scheduled time of the teleconference, the actual time, etc. are used to determine whether the operator is operating the vehicle during a schedule teleconference. When it is determined that the operator is operating the vehicle during a schedule teleconference, a prompt to join the scheduled teleconference is communicated to the operator. A confirmation to join the scheduled teleconference is received. Using the teleconference contact information extracted from the teleconference calendar event, the operator is connected to the scheduled teleconference. The calendar application can be stored on a mobile device of the operator or stored remotely and accessed via a communication network. The calendar application may be stored remotely in a cloud network, for instance. Additionally, permission is granted by the operator that allows access to the calendar application stored on the mobile device or accessed via the communication network.

Reference will now be made to the figures wherein like structures will be provided with like reference designations. The drawings are diagrammatic and schematic representations of example embodiments and, accordingly, are not limiting of the scope of the claimed subject matter, nor are the drawings necessarily drawn to scale.

Figure 1:
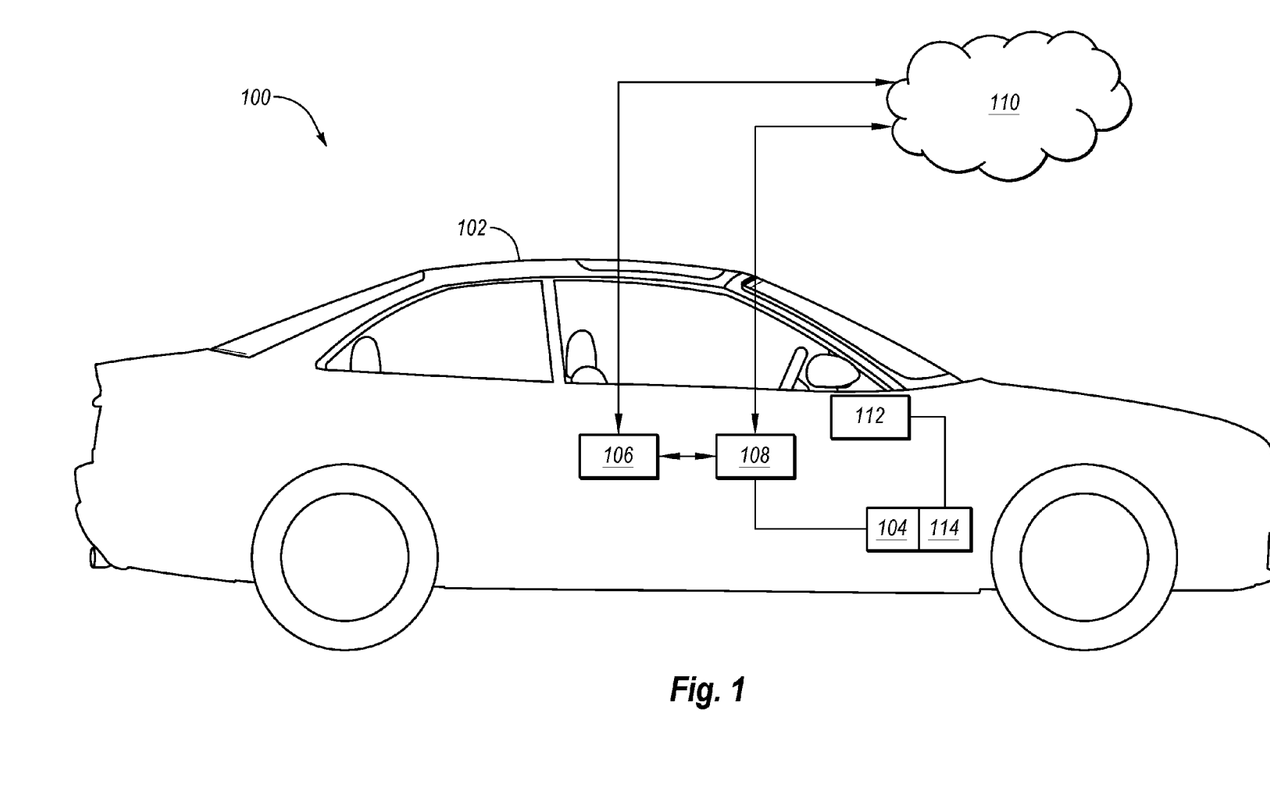
FIG. 1 illustrates an example operating environment in which some embodiments described herein may be implemented.

FIG. 1 illustrates an example operating environment 100 in which some embodiments described herein may be implemented. The operating environment 100 includes a vehicle 102 into which an abstraction and communication device (hereinafter "device") 108 is installed. Although illustrated as an automobile, this depiction is not meant to be limiting to the vehicle 102. Specifically, the vehicle 102 may include, but is not limited to, a car, a truck, a motorcycle, a tractor, an airplane, a boat, etc.

The device 108 is configured to communicate with a mobile device 106 and one or more vehicle components 112. To communicate with the vehicle components 112, the device 108 includes an adaptor 104 configured to interface with one or more Controller Area Network (hereinafter "CAN") buses 114. The CAN bus 114 connects to the vehicle components 112 such that operational states of the vehicle components 112 can be received, monitored, and/or modified. The CAN bus 114 can alternatively or additionally include any bus used in a vehicle 102 for communicating signals between components, including other standards like media oriented systems transport (MOST), local interconnect network (LIN), Inter-Integrated Circuit (I2C), and Ethernet. In operation, the device 108 relays vehicle data between the vehicle 102 and the mobile device 106.

For example, the vehicle components 112 can include a global positioning system (hereinafter "GPS") receiver and/or a speed sensor. Accordingly, the related operational states can be a position and a time sensed by the GPS receiver and/or a speed of the vehicle 102 sensed by the speed sensor. As the vehicle 102 operates, the position, the time, and the speed are communicated to the CAN bus 114. The device 108 abstracts the position, the time, and the speed using the adaptor 104 and communicates the position, the time, and the speed to the mobile device 106, to another device which is accessed by directly via the communication network 110, or to another device accessed by tethering to the communication network 110 through the mobile device 106. The mobile device 106 and/or one or more other devices can have a mobile navigation application configured to receive and/or use the position, the time, and the speed. When the operator accesses the device 108 via the mobile device 106 and/or the communication network 110, the operational state of the vehicle 102 is fully determined and may be used for predictive teleconferencing based on calendar events. Navigation data can include a real-time display and/or voice guidance of the mobile navigation application on a display and/or speakers in the vehicle 102, using the position, the time, and the speed. Navigation data may also be communicated to the device 108 to be projected to a head unit, for instance.

The vehicle 102, the device 108, the vehicle components 112, and the mobile device 106 can be configured, and/or communication between them can occur substantially as disclosed in U.S. patent application Ser. No. 13/664,212, entitled "AUTOMOBILE DATA ABSTRACTION AND COMMUNICATION" and filed Oct. 30, 2012, which is incorporated herein by reference in its entirety.

In some embodiments, projection of content communicated between the vehicle 102, the device 108, the vehicle components 112, and/or the mobile device 106 can occur substantially as disclosed in U.S. patent application Ser. No. 13/664,204, entitled "PROJECTION OF CONTENT TO EXTERNAL DISPLAY DEVICES" and filed Oct. 30, 2012, which is incorporated herein by reference in its entirety.

Figure 2:
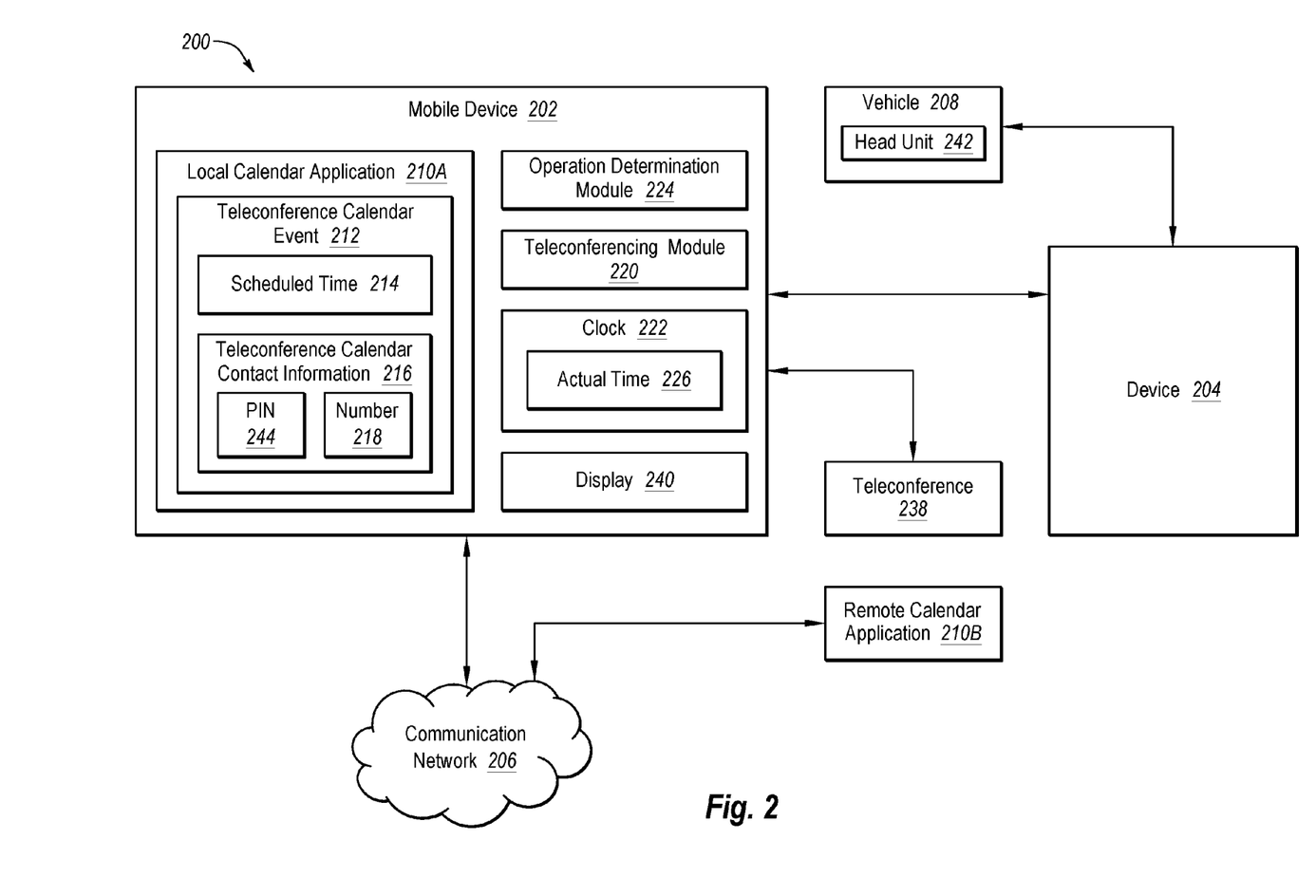
FIG. 2 illustrates a block diagram of an example vehicle teleconferencing system that may be implemented in the operating environment of FIG. 1.

FIG. 2 illustrates a block diagram of an example vehicle teleconferencing system 200 that may be implemented in the operating environment 100 of FIG. 1. The vehicle teleconferencing system 200 is configured to determine that an operator (not shown) is a participant in a teleconference 238 based on information (e.g., 214, 216, 218, and 244) accessed from a calendar application 210A or 210B of the operator. Generally, the teleconference 238 may be ongoing or may be about to start. The vehicle teleconferencing system 200 extracts some of the information (e.g., 214, 216, 218, and 244) associated with a particular teleconference calendar event 212 to automatically connect the operator to the teleconference 238. By determining that the operator is a participant in the teleconference 238 and automatically connecting the operator 238, the operator is not forced to manually enter information (e.g., 214, 216, 218, and 244) to connect to the teleconference 238. The vehicle teleconferencing system 200 thus saves time and unnecessary steps for the operator and avoids potentially dangerous situations such as the manual entry of such information while driving.

The vehicle teleconferencing system 200 includes a mobile device 202, an abstraction and communication device (hereinafter "device") 204, a communication network 206, and the vehicle 208 which are substantially similar to the mobile device 106, the device 108, the communication network 110, and the vehicle 102 of FIG. 1. Generally, in the vehicle teleconferencing system 200, the mobile device 202 can access a local calendar application 210A by communicating internally within the mobile device 202. Additionally, the mobile device 202 can access a remote calendar application 210B via the communication network 206. Although two calendar applications 210A, 210B are illustrated in FIG. 2, more generally, the mobile device 202 may have access to as few as one or more calendar applications 210. The local calendar application 210A and the remote calendar application 210B are collectively referred to herein as "calendar application 210" or "calendar applications 210". The information (e.g., 214, 216, 218, and 244) included in the calendar application 210 may be accessed and/or extracted by the mobile device 202 to determine that the operator is a participant in the teleconference 238.

The illustrated embodiment of the mobile device 202 includes an operation determination module 224. This depiction, however, is not meant to be limiting. In some embodiments, the operation determination module 224 can be integrated onto the device 204 such that the functionality associated with the operation determination module 224 is integrated into the device 204 and communicated to the mobile device 202.

The operation determination module 224 is configured to receive vehicle data from the vehicle 208 (via the device 204), the mobile device 202, and/or the communication network 206 to determine whether the operator is operating the vehicle 208. For example, the operation determination module 224 is configured to read or otherwise sense synchronization between the mobile device 202 and the device 204. The synchronization can indicate that the operator is present within the vehicle 208 or that the mobile device 202 operated by the operator is present in the cabin of the vehicle 208. Additionally or alternatively, the operation determination module 224 can be configured to receive a particular input from one or more vehicle components such as the vehicle components 112 of FIG. 1 via the device 204, which can indicate that the operator is operating the vehicle 208.

The mobile device 202 also includes a clock 222. The clock 222 can include a mechanism configured to track actual time 226, which can include the date and time of day, or can include another suitable component configured to receive a clock signal. For instance, GPS navigation applications receive a clock signal that includes the date and time of day. The vehicle 208 and/or the mobile device 202 may include such a GPS navigation application; the clock 222 can include a mechanism configured to access the clock signal from the GPS navigation application. Either by internally tracking or through accessing a clock signal or through any other suitable method, the clock 222 is configured to track the actual time 226.

The mobile device 202 also includes teleconferencing module 220. The teleconferencing module 220 is configured to receive the actual time 226 from the clock 222 and to receive a determination that the operator is operating the vehicle 208 from the operation determination module 224.

Additionally, the teleconferencing module 220 is configured to access the teleconference calendar event 212 from the local calendar application 210A and/or the remote calendar application 210B. The teleconference calendar event 212 is depicted only in the local calendar application 210A in FIG. 2, however it should be appreciated, with the benefit of the present disclosure, that the remote calendar application 210B can include the calendar event 212.

The calendar application 210 can be generated and supported by any calendar software, commercial or otherwise, that allows the operator to input one or more teleconference calendar events 212. Generally, the operator or someone affiliated with the operator inputs the teleconference calendar event 212 into the calendar application 210 using a computer or mobile device outside the vehicle in advance of the calendar event 212, such that the teleconference calendar event 212 is saved on a computer readable media in a standard format such as .ics iCalendar file format.

The teleconference calendar event 212 generally includes a reminder of a scheduled teleconference in which the operator intends on participating. The teleconference calendar event 212 includes teleconference contact information 216 and a scheduled time 214. The teleconference contact information 216 includes a teleconference telephone number 218 (in FIG. 2, "number") and a teleconference pin number 244 (in FIG. 2, "PIN"). Collectively, the teleconference contact information 212 and the schedule time 214 are referred to as "teleconference event information 216/218." The scheduled time 214 refers to the time at which the scheduled teleconference represented by teleconference calendar event 212 is to occur. Likewise, the teleconference contact information 216 is the call-in information used to access and participate in the scheduled teleconference 238.

The teleconferencing module 220 is configured to access and extract the teleconference event information 216/218 associated with the teleconference calendar event 212. The teleconferencing module 220 can access and extract the teleconference event information 216/218 internally within the mobile device 202 and/or via the communication network 206 from the remote calendar application 210B. For example, the local calendar application 210A can be stored on the mobile device 202. When the mobile device 202 is synchronized with the device 204, the teleconferencing module 220 accesses and extracts the teleconference event information 216/218 from the local calendar application 210A. Additionally or alternatively, the remote calendar application 210B can be stored on another device (not shown), such as a cloud network, that is accessible via the communication network 206. When it is determined that the operator is operating the vehicle 208 and/or during operation of the vehicle teleconferencing system 200, the teleconferencing module 220 accesses and extracts the teleconference event information 216/218 via the communication network 206 from the remote calendar application 210B.

Accordingly, the teleconferencing module 220 includes various software and/or hardware developed to interface with multiple calendar applications. Thus, the operator can purchase, use, or change between multiple calendar applications and the teleconferencing module 220 can still access and extract teleconference event information 216/218 therefrom.

In operation, when the operator is operating the vehicle 208, the teleconferencing module 220 accesses and extracts the scheduled time 214 and/or the teleconference contact information 216 associated with the teleconference calendar event 212. Based at least partially on the scheduled time 214, the teleconferencing module 220 determines that the operator is a participant in the teleconference 238.

In some embodiments, when the actual time 226 is within a predetermined threshold of the scheduled time 214 and the operator is operating the vehicle 208, the teleconferencing module 220 determines that the operator is a participant in the teleconference 238 and prompts the operator to join the teleconference 238. The predetermined threshold can include 1 minute, 2 minutes, 3 minutes, or some other predetermined threshold, for example. The predetermined threshold can be designated by the operator, have a default setting, or be related to a scheduled length of the teleconference 238.

The prompt to join the teleconference 238 is communicated to the operator by displaying or announcing some details of the teleconference 238 via an operator interface. The operator interface includes a display 240 included in the mobile device 202, a head unit 242 included in the vehicle 208, and/or another suitable operator interface that allows communication of the prompt to join the teleconference 238 and allows reception of a confirmation to join the teleconference 238 from the operator.

For example, the prompt to join the teleconference 238 may be transmitted visually on the display 240 or the head unit 242, or as an audible prompt via a speaker or other audio device included in the vehicle 208 and/or the mobile device 202. The confirmation of the operator can include an audio confirmation received by the mobile device 202 or the head unit 242 of the vehicle 208. The audio confirmation may be a simple reply such as "connect" such that the operator's attention is not withdrawn from driving. Alternately or additionally, the confirmation of the operator can include a touch of a button, touch interface, or other input device of the vehicle 208 and/or the mobile device 202 by the operator.

The teleconferencing module 220 extracts the teleconference contact information 216. In some embodiments, the teleconferencing module 220 extracts the teleconference contact information 216 after confirmation is received from the operator. Alternatively, the teleconferencing module 220 can extract the teleconference contact information 216 prior to receiving confirmation while accessing the teleconference event information 216/218.

The teleconference contact information 216 is communicated to the mobile device 202 such that the mobile device 202 automatically places a call to connect the operator to the teleconference 238. In effect, the teleconferencing module 220 assumes that if the operator is operating the vehicle 208 within a certain amount of time before the scheduled time 214 of a teleconference calendar event 212, the operator is a participant in the teleconference 238, but will be operating a vehicle 208 during the teleconference 238.

In some embodiments, the teleconference contact information 216 includes the teleconference telephone number 218 and the teleconference pin number 244. To join the teleconference 238, the teleconference telephone number 218 and the teleconference pin number 244 may have to be entered at different times. For instance, a teleconferencing service may be initially accessed by dialing the teleconference telephone number 218 then after some delay; the teleconference pin number 244 is entered. Usually, the teleconference service prompts or requests entry of the teleconference pin number 244. Accordingly, in these and other embodiments, the teleconferencing module 220 is further configured to interface with the mobile device 202 such that the mobile device 202 dials the teleconference telephone number 218, and, when prompted, enters the teleconference pin number 244.

By dialing the teleconference telephone number 218 and/or entering the teleconference pin number 244, the mobile device 202 is connected to the teleconference 238 and a teleconference connection between the mobile device 202 and the teleconference 238 is established.

The teleconferencing module 220 monitors the teleconference 238 to detect interruptions in a teleconference connection. When the teleconferencing module 220 detects an interruption, the teleconferencing module 220 repeats the prompt (or re-prompts) to the operator to re-join the teleconference. Following a second (or subsequent) confirmation by the operator to re-join the teleconference, the teleconferencing module 220 interfaces with the mobile device 202 to re-place the call, thus the operator re-joins the teleconference 238.

As above, the connection between the mobile device 202 and the teleconference 238 may be re-established using the teleconference contact information. For example, the mobile device 202 may dial the teleconference telephone number 218 and then enter the pin 244.

Additionally, the vehicle teleconferencing system 200 can be configured to prompt the operator for permission to access the calendar application 210. The prompt can be communicated via the operator interface (e.g., the display 240 or the head unit 242 as discussed above) or can be included in an initialization between the operator, the mobile device 202, the device 204, or any combination thereof. In these and other embodiments, once permission is obtained from the operator, the teleconferencing module 220 can thereafter access the calendar application 210.

Figure 3:
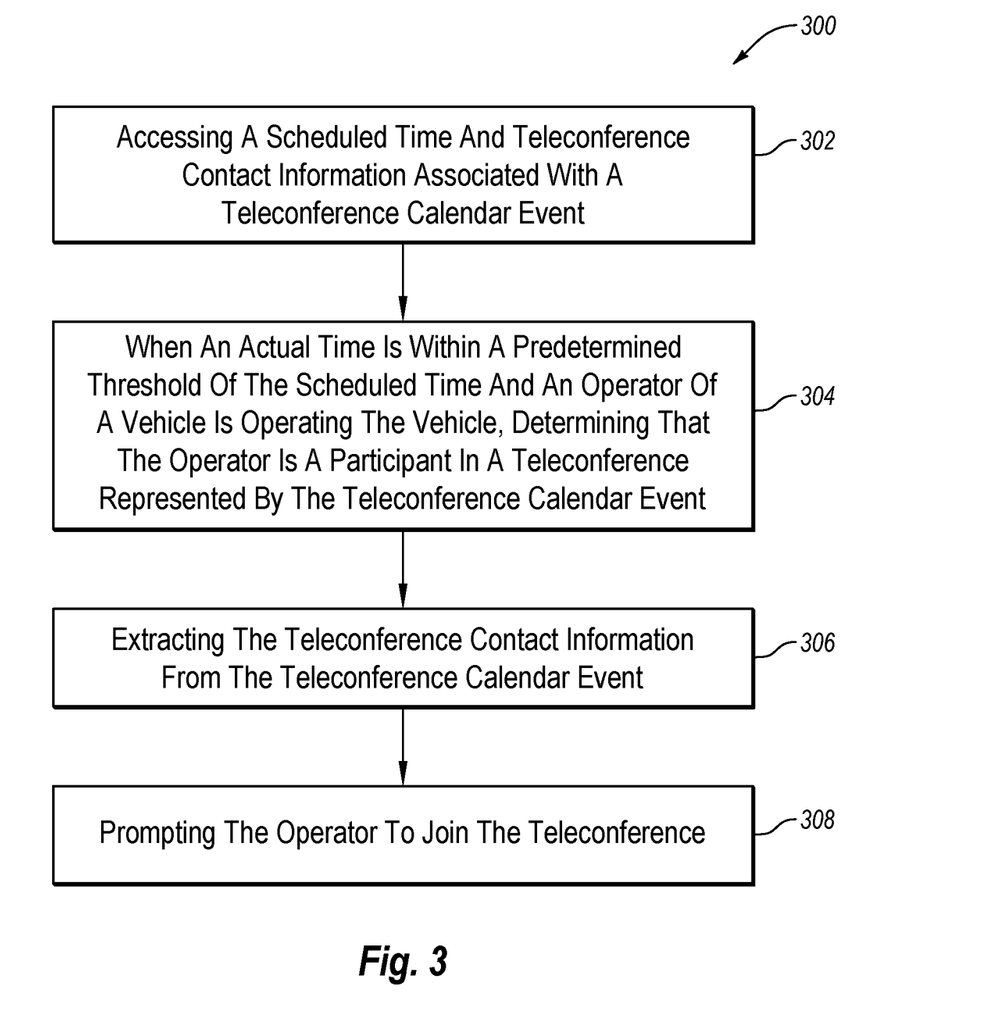
FIG. 3 is a flow chart of an example method of teleconferencing during operation of a vehicle, arranged in accordance with at least some embodiments described herein.

FIG. 3 is a flow chart of an example method 300 of teleconferencing during operation of a vehicle, arranged in accordance with at least some embodiments described herein. The method 300 begins at 302 by accessing a scheduled time and teleconference contact information associated with a teleconference calendar event. The scheduled time and the teleconference contact information may be accessed from a local calendar application loaded on a mobile device and/or from a remote calendar application. The remote calendar application is accessed through a communication network such as a WiFi, 3G, 4G, LTE, etc. An example of the remote calendar application is a commercial calendar application stored in a cloud network that is accessed via a wireless communication network.

At 304, when an actual time is within a predetermined threshold of the scheduled time and an operator of a vehicle is operating the vehicle, it is determined that the operator is a participant in a teleconference represented by the teleconference calendar event.

At 306, the method 300 includes extracting the teleconference contact information from the teleconference calendar event. At 308, the operator is prompted to join the teleconference. The prompt can be an audio or visual prompt. The operator can confirm a desire to join the teleconference with an audio or touch confirmation, for instance.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments. For instance, in some embodiments the method 300 includes receiving a confirmation from the operator to join the teleconference. When the confirmation is received, the method 300 includes placing a call using the teleconference contact information to join the teleconference. Placing the call includes dialing a teleconference telephone number, and when prompted, entering a teleconference pin number. For example, a teleconference service may prompt participants to enter the teleconference pin number after dialing the teleconference telephone number.

Additionally, the method 300 also includes monitoring the teleconference to detect interruptions in a teleconference connection. When an interruption is detected, the method 300 includes re-prompting the operator to re-join the teleconference. When a second (or subsequent) confirmation from the operator to re-join the teleconference is received, the method 300 includes re-placing the call using the teleconference contact information.

Figure 4:
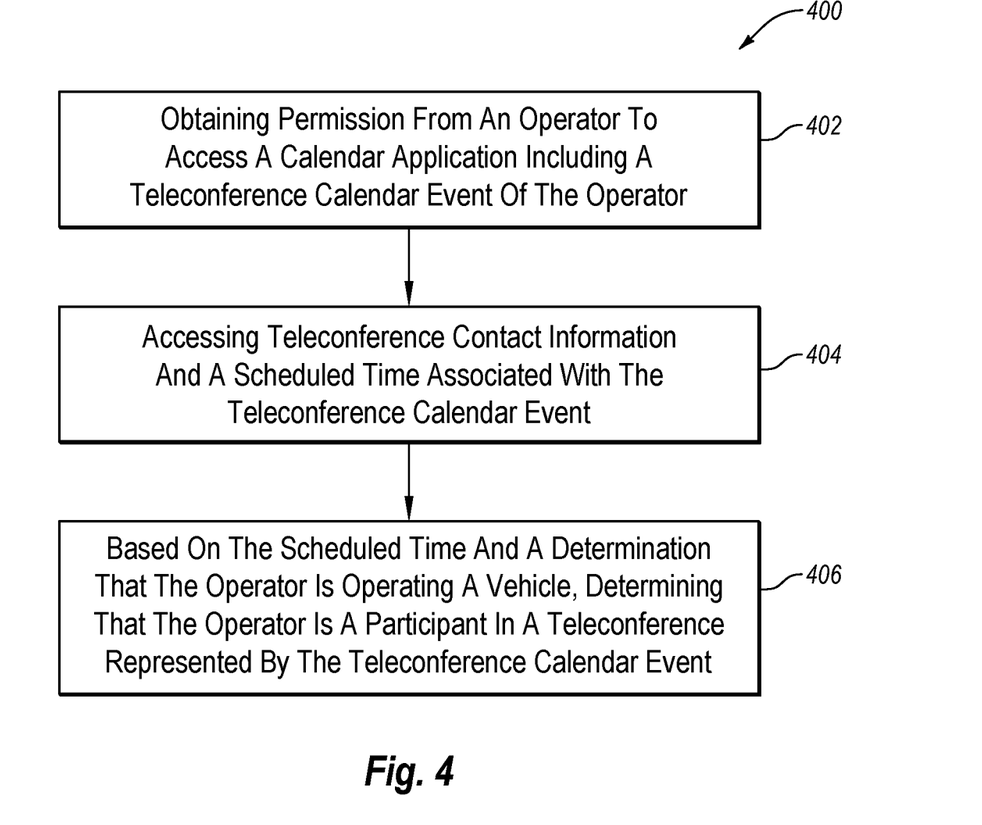
FIG. 4 is a flow chart of an example method of automated teleconferencing while operating a vehicle, arranged in accordance with at least some embodiments described herein.

FIG. 4 is a flow chart of an example method 400 of automated teleconferencing while operating a vehicle, arranged in accordance with at least some embodiments described herein. The method 400 begins at 402 by obtaining permission from an operator to access a calendar application including a teleconference calendar event of the operator.

At 404, teleconference contact information and a scheduled time are accessed that are associated with the teleconference calendar event. For example, the teleconference contact information and the scheduled time can be accessed by communicating with a local calendar application loaded on a mobile device or by communicating with a remote calendar application via a wireless communication network.

At 406, based on the scheduled time and a determination that the operator is operating a vehicle, it is determined that the operator is a participant in a teleconference represented by the teleconference calendar event.

In some embodiments, the operator is prompted to join the teleconference. For example, the prompt may include an audio or visual prompt. When a confirmation from the operator to join the teleconference received, the teleconference contact information is extracted from the teleconference calendar event; and a mobile device of the operator is connected to the teleconference using the teleconference contact information. In some embodiments, connecting the mobile device to the teleconference includes establishing a teleconference connection between a mobile device of the operator and the teleconference using the teleconference contact information.

Additionally or alternatively, the method 400 includes monitoring the teleconference connection between the mobile device and the teleconference for interruptions. When an interruption is detected, the method 400 includes re-connecting the mobile device.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including random-access memory (RAM), read-only memory (ROM), electrically erasable programmable read-only memory (EEPROM), compact disc read-only memory (CD-ROM) or other optical disk storage, magnetic disk storage or other magnetic storage devices, or any other storage medium which may be used to carry or store desired program code in the form of computer-executable instructions or data structures and which may be accessed by a general purpose or special purpose computer such as a system-on-chip (SOC). Combinations of the above may also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory computer-readable medium having encoded therein programming code executable by one or more processors to perform or control performance of operations of a vehicle teleconference system, the operations comprising:
   accessing a scheduled time and teleconference contact information associated with a teleconference calendar event;
   determining whether an operator is operating a vehicle based at least partially on a synchronization between a mobile device and an abstraction and communication device that is configured to be interfaced with a Controller Area Network (CAN) bus of the vehicle;
   when an actual time is within a predetermined threshold of the scheduled time and the operator is operating the vehicle, determining whether the operator is one of a plurality of participants of a teleconference that is represented by the teleconference calendar event;
   in response to the operator being one of a plurality of participants, extracting the teleconference contact information from the teleconference calendar event;
   communicating a prompt to the operator to join the teleconference;
   receiving a confirmation from the operator to join the teleconference;
   communicating a signal indicating the confirmation to the mobile device via the abstraction and communication device; and
   placing a call using the mobile device and the teleconference contact information to join the teleconference.

2. The non-transitory computer-readable medium of claim 1, wherein the determining whether an operator is operating the vehicle is further based at least partially on vehicle data that is abstracted by the abstraction and communication device from the vehicle.

3. The non-transitory computer-readable medium of claim 1, wherein:
   the prompt is communicated to a display of the mobile device or an audio device of the mobile device via the abstraction and communication device, and
   the confirmation is received at the display of the mobile device or the audio device of the mobile device.

4. The non-transitory computer-readable medium of claim 1, wherein:
   the prompt is communicated via a head unit of the vehicle or an audio device of the vehicle; and
   the confirmation is received at the head unit of the vehicle or the audio device of the vehicle.

5. The non-transitory computer-readable medium of claim 1, wherein the placing the call includes:
   dialing a teleconference telephone number, and
   when prompted, entering a teleconference pin number.

6. The non-transitory computer-readable medium of claim 1, wherein the operations further comprise monitoring the teleconference to detect interruptions in a teleconference connection.

7. The non-transitory computer-readable medium of claim 6, wherein the operations further comprise re-prompting the operator to re-join the teleconference in response to an interruption being detected.

8. The non-transitory computer-readable medium of claim 7, wherein the operations further comprise:
   receiving a second confirmation from the operator to re-join the teleconference; and
   re-placing the call using at least a portion of the teleconference contact information.

9. The non-transitory computer-readable medium of claim 1, wherein the teleconference contact information is stored in a local calendar application that is loaded on the mobile device or a remote calendar application that is accessible via a wireless communication network.

10. The non-transitory computer-readable medium of claim 1, wherein:
    the operations further comprise prompting the operator for permission to access a calendar application that includes the teleconference calendar event of the operator and receiving permission from the operator; and
    the accessing the scheduled time and the teleconference contact information is performed in response to a received permission.

11. A non-transitory computer-readable medium having encoded therein programming code executable by one or more processors to perform or control performance of operations of a vehicle teleconference system, the operations comprising:
    obtaining permission from an operator to access a calendar application that includes a teleconference calendar event of the operator;
    accessing teleconference contact information and a scheduled time associated with the teleconference calendar event;
    determining that the operator is a participant in a teleconference represented by the teleconference calendar event based at least partially on the scheduled time;
    determining that the operator is currently operating a vehicle that is interfaced with a mobile device of the operator via an abstraction and communication device;
    while the vehicle is operating, communicating a prompt to the operator to join the teleconference;
    receiving a confirmation from the operator to join the teleconference;
    extracting the teleconference contact information from the teleconference calendar event; and
    in response to the confirmation, placing, using the mobile device, a call to join the teleconference using the teleconference contact information.

12. The non-transitory computer-readable medium of claim 11, wherein:
the prompt is communicate to a head unit of the vehicle via the abstraction and communication device and a Controller Area Network (CAN) bus of the vehicle;
the confirmation is received at the head unit from the operator; and
the confirmation is further communicated to the mobile device via the abstraction and communication device and CAN bus of the vehicle.

13. The non-transitory computer-readable medium of claim 11, wherein:
the prompt is communicated to a display of the mobile device or an audio device of the mobile device, and
the confirmation is received at the display of the mobile device or the audio device of the mobile device.

14. The non-transitory computer-readable medium of claim 11, wherein the accessing the teleconference contact information and the scheduled time includes communicating with a local calendar application loaded on the mobile device.

15. The non-transitory computer-readable medium of claim 11, wherein the accessing the teleconference contact information and the scheduled time includes communicating with a remote calendar application via a wireless communication network.

16. The non-transitory computer-readable medium of claim 11, wherein the operations further comprise monitoring a teleconference connection between the mobile device and the teleconference for interruptions.

17. The non-transitory computer-readable medium of claim 16, wherein the operations further comprise, re-placing a call to re-join the teleconference using the teleconference contact information and the mobile device in response to detection of an interruption.

18. The non-transitory computer-readable medium of claim 11, wherein the determination that the operator is operating a vehicle is based at on one or both of:
a synchronization between a mobile device and the abstraction and communication device; and
vehicle data that is abstracted by the abstraction and communication device from the vehicle.

19. The non-transitory computer-readable medium of claim 11, wherein the obtaining permission from the operator to access a calendar application includes:
prompting the operator for permission to access the calendar application; and
receiving permission from the operator.

20. The non-transitory computer-readable medium of claim 11, wherein:
the teleconference contact information includes a teleconference telephone number and a teleconference pin number, and
the placing the call using the mobile device includes dialing the teleconference telephone number and, when prompted, entering the teleconference pin number.

* * * * *